F. G. LEWIS.
DRAFT EQUALIZER.
APPLICATION FILED FEB. 21, 1908.
915,614.
Patented Mar. 16, 1909.
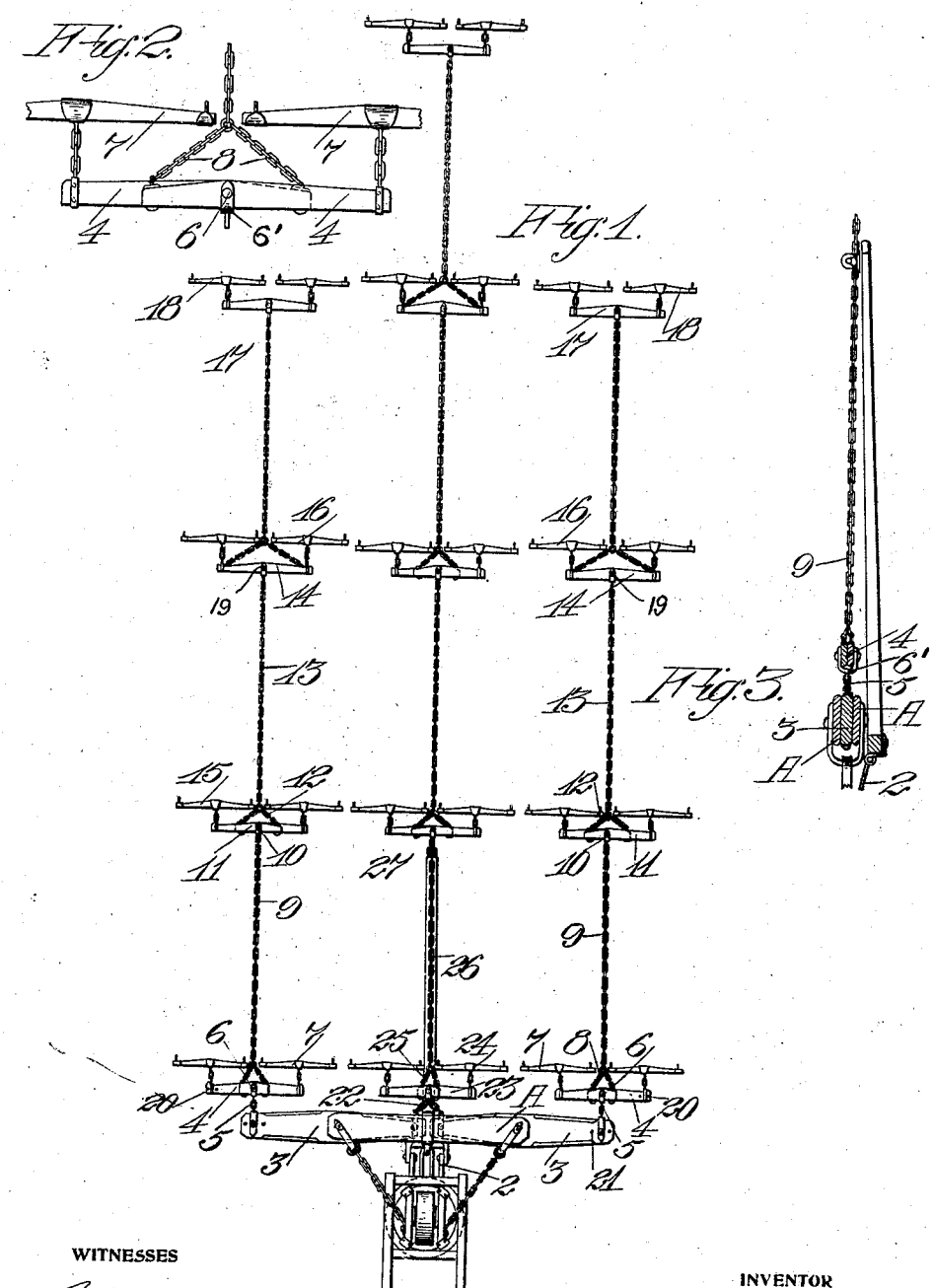

UNITED STATES PATENT OFFICE.

FREDERICK G. LEWIS, OF ALMIRA, WASHINGTON, ASSIGNOR OF ONE-HALF TO ERNEST COBURN AND RICHARD H. SCHREIBER, OF LIND, WASHINGTON.

DRAFT-EQUALIZER.

No. 915,614.     Specification of Letters Patent.     Patented March 16, 1909.

Application filed February 21, 1908. Serial No. 417,154.

*To all whom it may concern:*

Be it known that I, FREDERICK G. LEWIS, a citizen of the United States, residing at Almira, in the county of Lincoln and State of Washington, have invented new and useful Improvements in Draft-Equalizers, of which the following is a specification.

My invention relates to draft equalizers, and especially to a device for equalizing the pulls of a number of horses arranged in parallel series, either two, four or six abreast.

The special object of the present invention is to devise a form of equalizer by which the draft of large teams will be successfully equalized, and whereby no horse can pull more than his share of the load; and also whereby, on the starting of any two or more horses in the team, all the other horses will have their proportionate share of the load thrust upon them, and thus induce them to start.

The invention consists of the parts and the construction and combination of parts as hereinafter more fully described and claimed, having reference to the accompanying drawings, in which—

Figure 1 is a plan view showing the arrangement of my draft equalizer. Fig. 2 is an enlarged view of one of the equalizing levers and swingletrees. Fig. 3 is a longitudinal section showing the pole and connections.

A represents a rearmost draft-bar, preferably made in upper and lower sections, as shown, and fulcrumed to the tongue of the vehicle, which latter is represented at 2.

Between the sections of the draft-bar A, and at the ends thereof, are fulcrumed the equalizing levers 3; and from the inner and outer ends of these equalizing levers extend forward, as here shown, devices for the attachment of three strings of animals arranged in longitudinal parallel series, and with the horses in the several strings arranged six abreast in transverse series.

To the outer end of each equalizing lever 3 is connected a pair of equalizing levers 4, by means of suitable clevis and chain connections 5. These levers 4 overlap each other at their inner ends, and a bolt 6 passes through both levers and forms a central fulcrum, to which the clevis 6' connecting the chain 5 is attached. To the outer end of each lever 4 is adjustably secured a swingletree 7.

Each inner end of each lever 4 is connected to a crotched chain 8, which latter has a forward continuation in the chain 9, which latter connects through a suitable pivotal connection 10 with a forward pair of draft equalizers 11. The equalizers 11 are similar in construction to the rear equalizers 4, and their inner ends are connected by crotched chains 12, and therethrough to a chain 13, which continues forward to a third pair of equalizers 14. The equalizers 11 have corresponding swingletrees 15, and the equalizers 14 have corresponding swingletrees 16. Forward of the equalizers 14 is a single equalizer or doubletree 17 carrying the swingletrees 18.

The equalizers 4—11—14 are substantially all alike, except that the short ends vary in length according to their place in the hitch; the shortest ones being in the rear. Thus, the equalizers 14 are of equal length, and are both fulcrumed on the pin 19 at their middle, since the two horses attached to the swingletrees 16 counterbalance the two horses on the swingletrees 18 in front. The equalizers 11 are fulcrumed at a distance from their inner ends equal approximately to one-third their length, since the two horses which are attached to the equalizers 11 counterbalance the four horses in front. Correspondingly, the equalizers 4 are fulcrumed in the proportion of one to three, since the two horses attached to these equalizers counterbalance the six horses in front.

The outer end of each of the equalizing bars is provided with appropriate adjustments 20, so that any horse in the team can be given an advantage over the others, if found necessary or desirable; and the leverage of each string of animals on the equalizers 3 may be adjusted by suitable means, as shifting the pivot of the rear clevis in one or other of the holes 21 in the rearmost equalizers.

The inner ends of the rear equalizers 3 are flexibly connected by short chains 22 with a pair of overlapping equalizers 23 having corresponding swingletrees 24. These equalizers 23 correspond in construction and operation to the rear equalizers 4, previously described, and their inner ends are connected by a crotched chain 25 and long chain 26 with other and like equalizers 27 in advance; the series being extended to any desired length.

By this construction of equalizer, I am able to equalize the draft of any number of horses, from three to thirty-six or more, and to arrange these horses two, four or six abreast.

The hitch may be used as an entirety, as here shown, with three strings of animals, or any single string may be detached from the rear draft-bars 3 and used separately; and any one or more sections or pairs of equalizers, as 14—11 and 4 may be used in conjunction with a forward draft-bar 17; the essential feature of this invention being the particular arrangement of the overlapping equalizing bars with their flexible connections to a draft appliance in front.

Having thus described my invention, what I claim and desire to secure by Letters Patent is—

1. A draft equalizer comprising pairs of overlapping equalizing levers, the levers in each pair having a common fulcrum, draft-trees at the outer ends of said levers, and a draft connection between the fulcrum point of each pair of levers in front with the inner ends of the equalizing levers next adjacent and in rear.

2. A draft equalizer comprising a rear draft-bar, equalizing bars fulcrumed thereon, pairs of overlapping equalizing levers arranged in series one behind the other, each of said pairs of equalizing levers having a common fulcrum, draft connections between the respective fulcra of the two outside rearmost pairs of equalizing levers and the outer ends of said equalizing bars on the rear draft-bar, a draft connection between the fulcrum of the rearmost pair of equalizers of the central series and the inner ends of said equalizing bars, draft connections between the pivots of the equalizing levers in front and the inner ends of the equalizing levers next adjacent and in rear, draft-trees at the ends of the equalizing levers, a draft-bar in front of the foremost of the equalizing levers in each series, and a draft connection between each of said draft-trees and the inner ends of the equalizing levers next adjacent and in rear.

3. In combination, a main draft equalizer, a plurality of equalizing draft devices comprising crossed or overlapped equalizing levers pivoted together, and couplings connected to their inner ends, said draft devices arranged successively in parallel independent lines from said main draft equalizer, each of said draft devices being connected to the fulcrum of the equalizing levers of the draft device next in front and to the inner ends of like levers on the draft device immediately in rear thereof.

4. A draft equalizer comprising a pair of crossed or overlapped equalizing levers pivoted together, a coupling linked to the inner ends of said crossed levers, draft attachments on the outer ends of the same, a forward connecting means linked to said coupling, and a rear connection coupled to the fulcrum of said levers.

In testimony whereof I have hereunto set my hand in presence of two subscribing witnesses.

FREDERICK G. LEWIS.

Witnesses:
 MILTON C. SALTER,
 JULIUS C. JOHNSON.